(12) United States Patent
Torba

(10) Patent No.: US 6,445,788 B1
(45) Date of Patent: Sep. 3, 2002

(54) METHOD AND APPARATUS FOR PROVIDING FAIR ACCESS TO AGENTS IN A COMMUNICATION CENTER

(75) Inventor: Dmitriy A. Torba, San Bruno, CA (US)

(73) Assignee: Genesys Telecommunications Laboratories, Inc., San Francisco, CA (US)

(*) Notice: Subject to any disclaimer, the term of this patent is extended or adjusted under 35 U.S.C. 154(b) by 0 days.

(21) Appl. No.: 09/335,423

(22) Filed: Jun. 17, 1999

(51) Int. Cl.[7] .............................................. H04M 3/00
(52) U.S. Cl. ............................. 379/266.08; 379/265.14
(58) Field of Search ....................... 379/265.01, 265.02, 379/265.11, 265.14, 266.01, 266.08, 309

(56) References Cited

U.S. PATENT DOCUMENTS

| | | | | |
|---|---|---|---|---|
| 5,721,770 A | * | 2/1998 | Kohler ......................... | 379/266 |
| 5,740,238 A | * | 4/1998 | Flockhart et al. ............ | 379/221 |
| 5,754,639 A | * | 5/1998 | Flockhart et al. ............ | 379/221 |
| 5,959,982 A | * | 9/1999 | Federkins et al. ............ | 370/519 |
| 6,058,163 A | * | 5/2000 | Pattison et al. .............. | 379/265 |
| 6,330,323 B1 | * | 12/2001 | Gottlieb et al. ............ | 379/266.04 |
| 6,343,281 B1 | * | 2/2002 | Kardos et al. ............... | 707/201 |
| 6,353,667 B1 | * | 3/2002 | Foster et al. ................ | 379/265 |

* cited by examiner

Primary Examiner—Creighton Smith
(74) Attorney, Agent, or Firm—Donald R. Boys; Central Coast Patent Agency, Inc.

(57) ABSTRACT

A system for granting access to agents at a communication center in response to requests for connection from network-level entities starts a fairness timer having a fairness time period when a first request is received for and agent, monitors any other requests for the same agent during the fairness time, and executes an algorithm at the end of the fairness time to select the network-level entity to which the request should be granted. In a preferred embodiment the fairness time is set to be equal to or greater than twice the difference between network round-trip latency for the longest latency and shortest latency routers requesting service from the communication center. In some embodiments an agent reservation timer is set at the same point as the fairness timer to prevent calls to the same agent, and has a period longer than the fairness timer by a time sufficient for a connection to be made to the agent station once access is granted, and for notification of the connection to be made to network-level entities.

18 Claims, 3 Drawing Sheets

METHOD AND APPARATUS FOR PROVIDING FAIR ACCESS TO AGENTS IN A COMMUNICATION CENTER

Field of the Invention

The present invention is in the field of telephony communication and has particular application to methods including software for routing incoming telephony calls from multiple service control points to agent-level in a communication center wherein equal access is afforded to callers from separate routing systems.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventors and to those with skill in the art in general. For this reason, much minute detail of known systems is not reproduced here, as to do so may obscure the facts of the invention.

At the time of filing the present patent application there continues to be remarkable growth in telephone-based information systems. Recently emerging examples are telemarketing operations and technical support operations, among many others, which have grown apace with development and marketing of, for example, sophisticated computer equipment. More traditional are systems for serving customers of large insurance companies and the like. In some cases organizations develop and maintain their own telephony operations with purchased or leased equipment, and in many other cases, companies are outsourcing such operations to firms that specialize in such services.

A large technical support operation serves as a good example in this specification of the kind of applications of telephone equipment and functions to which the present invention pertains and applies, and a technical support organization will be used from time to time in the current specification for example purposes. Such a technical support system, as well as other such systems, typically has a country wide or even a world wide matrix of call centers for serving customer's needs. Such call center operations are more and more a common practice to provide redundancy and decentralization. However, the components of the present specification can apply to a single call center as well, and t home agent systems.

In a call center, a relatively large number of agents handle telephone communication with callers. Each agent is typically assigned to a telephone connected to a central switch, which is in turn connected to a public-switched telephone network (PSTN), well-known in the art. The central switch may be one of several types, such as Automatic Call Distributor (ACD), or a Private Branch Exchange (PBX).

An organization having one or more call centers for serving customers, typically provides one or more telephone numbers to the public or to their customer base, or both, that may be used to reach the service. The number or numbers may be published on product packaging, in advertisements, in user manuals, in computerized help files, and the like.

There are basically two scenarios. If the organization providing the service has a single call center, the number will be to the call center, and all further routing to an agent will be at the call center. If there are several call centers, the organization may provide several numbers, one for each call center, and the customer may be expected to use the number for the closest center, or for the center advertised to provide specifically the service he or she might need. In some cases the number provided will connect the caller with a first Service Control Point (SCP) which is adapted to pre-process incoming calls and forward the calls to other call centers.

Routing of calls, then, may be on several levels. Pre-routing may be done at SCPs and further routing may be accomplished at individual call centers. As described above, a call center typically involves a central switch, which may be, for example, an Automatic Call Distributor (ACD), or a Private Branch Exchange (PBX) or other equivalent (IP is switch less per se). The central switch is connected to the PSTN network, well known in the art. Agents, who are trained to handle customer service, use telephones connected to the central switch. This arrangement is known in the art as Customer Premises Equipment (CPE).

If the call center consists of just a central switch and connected telephone stations, the routing that can be done is very limited. Switches, although increasingly computerized, are limited in the range of computer processes that may be performed. For this reason additional computer capability in the art has been added for such central switches by connecting computer servers adapted to run control routines and to access databases. The processes of incorporating computer enhancement to telephone switches is known in the art as Computer Telephony Integration (CTI), and the hardware used is referred to as CTI equipment.

In a CTI system telephone stations connected to the central switch may be equipped also with computer terminals, so agents manning such stations may have access to stored data as well as being linked to incoming callers by a telephone connection. Such stations may be interconnected in a network by any one of several known network protocols, with one or more servers also connected to the network one or more of which may also be connected to a processor providing CTI enhancement, also connected to the central switch of the call center. It is this processor that provides the CTI enhancement for the call center.

When a call arrives at a call center, whether or not the call has been pre-processed at a SCP, typically at least the telephone number of the calling line is made available to the receiving switch at the call center by a telephone carrier. This service is available by most PSTNs as caller-ID information in one of several formats. If the call center is computer-enhanced (CTI) the phone number of the calling party may be used to access additional information from a database at a server on the network that connects the agent workstations. In this manner information pertinent to a call may be provided to an agent.

It is known to the inventors that more recently Data Network Telephony (DNT) communication has been integrated into the call center environment. Internet Protocol Network Telephony (IPNT), which is a sub-set of DNT, is most often used in today's DNT-capable call centers. Computer simulated telephony is now being practiced in many CTI call centers. In many cases, equipment is altered or modified to handle both Connection-Oriented-Switched-Telephony (COST) and DNT telephony simultaneously and in a seamless fashion. Because of added communication capabilities existing in today's call centers, a more appropriate term of communication center will hereinafter be used in this specification.

In a very large communication center, it is desired that all incoming calls whether from a COST network or from an IPNT network be handled efficiently by available agents. In some cases calls are routed from network level to a call center, and then further routed to agents at the communication center. Calls are typically distributed to such agents based on availability of the agent, and in this system availability of agents is tracked at the call center level. In other systems, employing what the inventors term agent-level routing, Service Control Points (SCPs) in the network route calls to agent level at call centers. In this arrangement agent availability is typically tracked at the network level, and updated from the call-center level. In either system If a first agent is unavailable, a caller must wait for the agent to become available, or be transferred to another available agent. When incoming calls to a communication center are from different routing systems in a telephony network it becomes difficult to insure equal and fair access to agents for all of the callers. This is due to various states of latency that exist in separate routing systems.

Latency factors such as equipment speed and line speed can vary, greatly over large geographical regions within a service network such as a public network. This is due to partly to the fact that older equipment is upgraded to new equipment on a gradual basis. The same is true with network lines and connections. Because of this inconsistency over large portions of a telephony network, some callers or groups of callers to a communication center may inadvertently get much better service because of the fact that they are being routed over faster lines with better equipment. In considering DNT networks, similar latency conditions exist that may cause some callers or groups of callers to receive poor service compared to those routed in over superior connections with superior equipment.

What is clearly needed is a method and apparatus that eliminates inadvertent unequal access associated with regional groups of callers that may exist because of unequal latency factors in their portion of a network. A system such as this would insure that all callers receive comparable service from a communication center regardless of the latency factors.

SUMMARY OF THE INVENTION

In a preferred embodiment of the present invention, in a communication center, a method for ensuring fairness in response to electronic requests from network-level entities to connect to an agent station at the communication center is provided, comprising steps of (a) receiving a first request from a first network-level entity for connection to the agent at the communication center; (b) starting a fairness timer for a timed period; (c) receiving, during the period of the fairness timer, a second request for the connection to the same agent station from a second network-level entity; and (d) determining to grant, through execution of a fairness algorithm at expiration of the period of the fairness timer, one of the first and second requests from the network level entities.

In preferred embodiments latency times for network level entities requesting connection at the communication center are known, and in step (b) the period of the fairness timer is set to be equal to or greater than twice the difference between network round-trip latency for the longest latency and shortest latency routers requesting service from the communication center. Also in preferred embodiments the requests may be for telephony connections, either connection-oriented switched telephony (COST) or Internet Protocol Network Telephony (IPNT) calls, including any type of multimedia calls.

In some embodiments the method includes a further step for starting an agent reservation timer at the same time as starting the fairness timer, the agent reservation timer having a period longer than that of the fairness timer. The time of the reservation timer in one embodiment is longer than that of the fairness timer by a time sufficient for a connection to be made to the agent station once access is granted, and for notification of the connection to be made to network-level entities. The fairness algorithm may operate on one or both of load and agent availability data.

In another aspect of the invention a communication center is provided, comprising a communication switching device connected to agent stations for switching communications to individual ones of the agent stations; a computer-telephony integration (CTI) processor coupled to the communication switching device; and a digital link between the CTI processor and network-level routing entities for receiving requests from network-level entities for connection to agent stations. In this communication center the CTI processor, on receiving a first request for connection to an agent station, starts a fairness timer having a time-out period, and in the event of receiving a second or more requests for connection to the same agent station during the fairness time period, executes a fairness algorithm at the end of the time-out period to determine which request to grant.

In preferred embodiments of the communication latency times for network-level entities requesting connection at the communication center are known, and the period of the fairness timer is set to be equal to or greater than twice the difference between network round-trip latency for the longest latency and shortest latency routers requesting service from the communication center. The connection requests may be for telephony connections, either connection-oriented switched telephony (COST) or Internet Protocol Network Telephony (IPNT) calls.

In some embodiments of the communication center the CTI processor starts an agent reservation timer at the same time as starting the fairness timer, and the agent reservation timer having a period longer than that of the fairness timer. A suggested value for the reservation timer is longer than that of the fairness timer by a time sufficient for a connection to be made to the agent station once access is granted, and for notification of the connection to be made to network-level entities. In preferred embodiments the fairness algorithm operates on one or both of load and agent availability data.

In yet another aspect of the invention an agent-reservation fairness software for operation in a communication center and dealing with requests by network-level routers for connection to agents at the communication center is provided, comprising a monitor for monitoring incoming requests for connection to agents; an initiator for starting a fairness timer having a fairness time-out period; and a fairness algorithm for determining which of multiple requests for connection to a same agent to grant. The monitor, on receiving a first request for connection to an agent causes the initiator to start the fairness timer, and at expiration of the fairness time-out period, in the event of further requests for connection to the same agent, the fairness algorithm executes and determines which request for the same agent to grant.

In preferred embodiments of the software the period of the fairness timer is set to be equal to or greater than twice the difference between network round-trip latency for the longest latency and shortest latency routers requesting service from the communication center. The requests may be for telephony connections, either connection-oriented switched telephony (COST) or Internet Protocol Network Telephony (IPNT) calls.

In some embodiments of the software there is a second initiator for starting an agent reservation timer at the same time as starting the fairness timer, the agent reservation timer having a period longer than that of the fairness timer. The period of the agent reservation timer is longer than that the fairness timer by a time sufficient for a connection to be made to the agent station once access is granted, and for notification of the connection to be made to network-level entities, and the fairness algorithm may operate on one or both of load and agent availability data.

In embodiments of the invention described below in enabling detail, for the first time a system is provided for call centers wherein fair access can be provided to requests for service from multiple and disparate sources having different latency characteristics, such that a request from a network entity having a long latency will receive equal chance of reserving and connecting to an agent as a network entity having a short latency.

BRIEF DESCRIPTION OF THE DRAWING FIGURES

DESCRIPTION OF THE PREFERRED EMBODIMENTS

As described in the background section, latency variations inherent in different routing systems can cause inadvertent priority states to exist for callers and groups of callers attempting to secure available agents in a communication center. The inventor provides a CTI system that eliminates or at least significantly reduces undesired priority states that may exist due to such latency differences.

Figure 1:
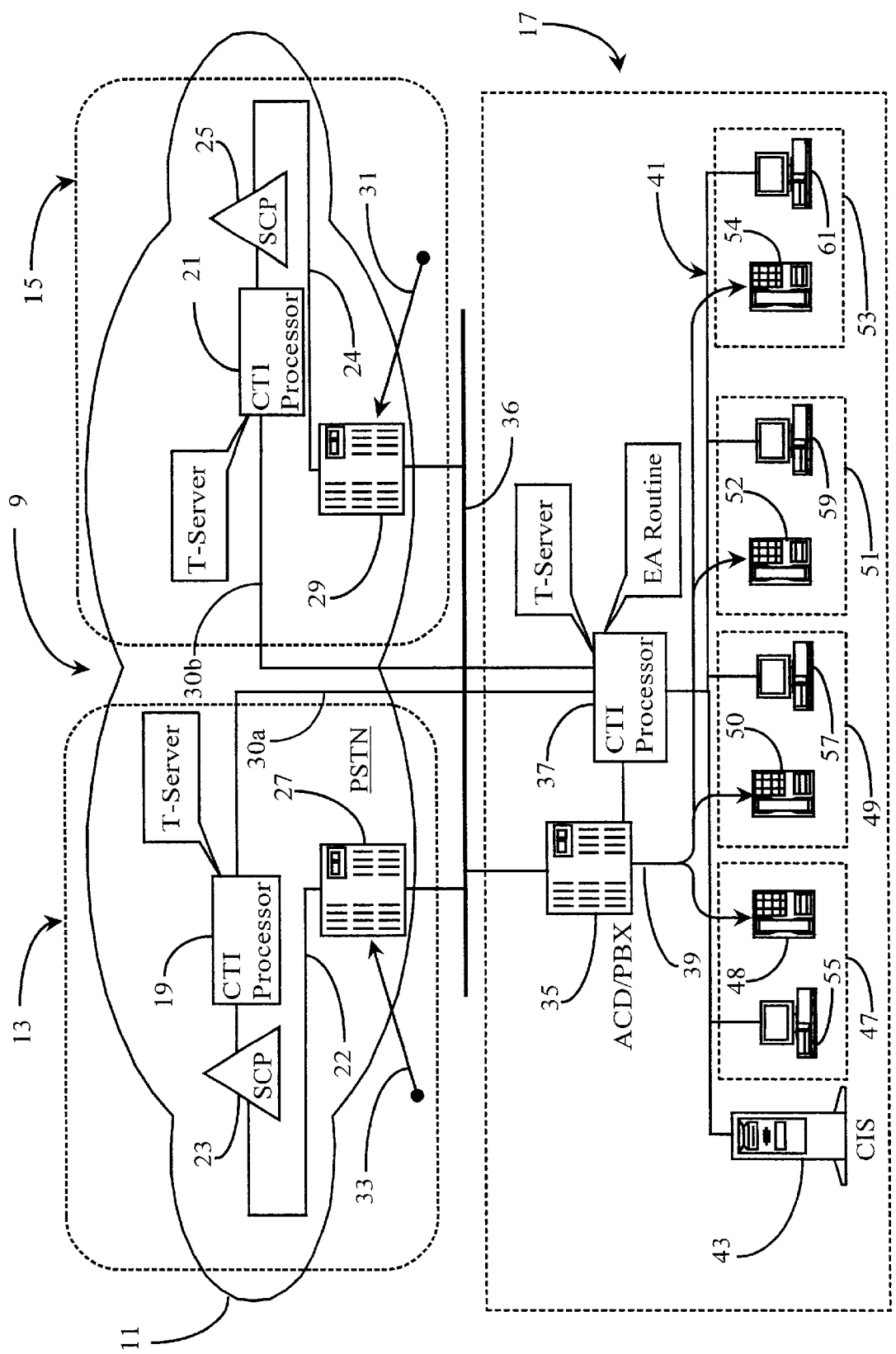
FIG. 1 is an overview of a network communication system enhanced with the software of the present invention according to an embodiment of the present invention.

FIG. 1 is an overview of a network communication system 9 enhanced with the software and according to an embodiment of the present invention. Communication system 9 comprises a telephony network 11 and a connected communication center 17. Network 11 may be a PSTN network, an IPNT network, or a combination of the two. In this example, network 11 is a PSTN network and will serve to describe examples of the present invention.

Communication center 17 may be a large CTI service center, or any other type of CTI-enhanced communication center. Center 17 may also be capable of IPNT communication in combination with COST communication. In this example, communication center 17 is a CTI-enhanced telephony center and will serve to enable explanation of the present invention.

It is known that there are many separate routing systems that may exist within a PSTN network such as network 11. Two such systems illustrated herein are system 13 and system 15. Systems 13 and 15 are separate from each other in that they use separate equipment and connection lines as well as separate router intelligence to route telephony traffic. Systems 13 and 15 represent any two routing systems in network 11 that are not local to each other in a geographic sense.

Routing system 13 has a local telephony switch 27 adapted to receive calls from individuals operating in that locale. Switch 27 may be an ACD or PBX type switch, or any other type of telephony switch that may be known in the art. An incoming call represented by a vector 33 is illustrated as arriving at switch 27.

In this example, switch 27 is connected by a telephony data line 22 to an SCP 23. SCP 23 provides routing decisions to switch 27 for calls 33. For example, calls from individuals using a 1-900 number, a 1-800 number, or the like for contacting communication center 17 are routed by SCP 23.

SCP 23 is enhanced by a CTI processor 19. Processor 19 enhances functionality of SCP 23 by virtue of software provided by the host of communication center 17. Such software enables communication center 17 to control routing of calls within network 11 according to enterprise rules. For example, an instance of a CTI application known as T-Server (known to the inventor) is provided and executable on processor 19. T-Server software provides a wide variety of intelligent routing routines that may be executed to determine how SCP 23 will route calls.

Routing system 15 has an equipment and connection scheme that, for the purpose of this invention, mirrors the components and elements in system 13. For example, a CTI switch 29 is provided and adapted to receive calls 31 from individuals in that locale. Switch 29 is connected to an SCP 25 by a data connection 24. A connected CTI processor 21 running an instance of T-server software enhances SCP 25.

It will be apparent to one with skill in the art that the equipment and exact connection schemes may vary from one routing system to another within network 11. However, the inventor illustrates identical schemes in each illustrated routing system 13 and 15 for the purpose of simplifying explanation of the present invention. Moreover, in a network such as PSTN 11, there may be many more separate routing systems than are illustrated here. However, the inventor deems that the illustration of two such systems in this example is sufficient to explain the present invention.

Both routing systems 13 and 15 are used to route incoming calls to communication center 17. To this end, communication center 17 is appropriately equipped to receive calls routed thereto by system 13 and system 15. For example, communication center 17 has a CTI telephony switch 35 that is adapted to receive calls from network 11. Switch 35 may be an ACD, PBX, or any other type of telephony switching system that is known in the art. Switch 35 is CTI-enhanced by virtue of a connected CTI processor 37 running an instance of T-server software. Switch 35 acts as a central switch for communication center 17. That is, all calls arriving from network 11 are received at switch 35 and distributed to individual agent stations 47–53.

Switch 35 is connected, by virtue of internal telephony wiring 39, to a plurality of agent-manned telephones 48, 50, 52, and 54. Telephones 48–54 are implemented one each at separate agent workstations 47, 49, 51, and 53 respectively. Stations 47–53 are equipped with agent-operated personal computer/video display units (PC/VDU's) that are connected to each other, and to a customer information server (CIS) 43 by a local area network (LAN) 41.

CTI processors 37 (center 17), 19 (routing system 13), and 21 (routing system 15) communicate by virtue of a digital networks 30a and 30b separate from telephony trunk lines 36 over which voice calls are routed. Networks 30a and b are adapted to enable data communication between such connected CTI processors. Communicated data may include such as command and control data, call information data, and the like. In this way, information about a call may arrive at communication center 17 ahead of an actual routed call. This allows agents operating at workstations such as stations 47–53 access to pre-event information and better prepares them to handle incoming calls.

In an enhanced telephony communication system such as system 9 described above, incoming calls 33 and 31 are routed from respective switches 27 and 29 to switch 35 over telephony infrastructure represented herein by trunk 36, which represents varied and alternative routing paths through network 11.

It will be appreciated that, in actual practice, routing systems 13 and 15 as well as network paths through infrastructure 36 will, in many cases, exhibit different latency characteristics. For example, routing system 13 may have older and slower equipment and slower network connections than routing system 15. If so, then routing system 13 will exhibit a higher latency for transactions with center 17 than will routing system 15. This latency difference can cause groups of callers from system 15 to enjoy, without design, better access to available agents in communication center 17. This is at least partly due to the requisite nature of telephony routing protocol. A network router must request a routing event, receive information regarding routing options, and only then can the router route the call from the local switch to a communication center.

A request for a routing event by a network router in embodiments of the present invention is made over the same network data links (30a, 30b) that are used for parallel data transfer, as described above. The request can be a negotiation between processors separate from the transfer of data from a network routing system (13, 15), or it may be combined with the data transfer. Similarly, in some embodiments of the invention the identity of the network router needs be known, and this piece of information may also be combined in the parallel data transfer for a pending call.

It will be apparent to the skilled artisan as well that the examples of the invention described with reference to two network routing systems (13, 15) are not limiting. Call requests may be negotiated in a call center with network routers as shown and described, but also between a call canter and other entities. Requests for routing may come from overflow at another call center, or in a load-balancing arrangement with several other centers, for example. The practice of the invention applies to all architectures wherein cal reservation requests may come to one center from another source.

To alleviate the problem of inadvertent preference or priority as stated above, the inventor provides herein a software routine termed a "fair access" (FA) routine. The FA routine executes on CTI processor 37, and may be integrated with T-server software. The inventor illustrates the FA routine separately from T-server software simply to show separate function. The FA software provides a fairness timer function each time an agent is reserved, and denies access to that agent to any incoming request route until the time period has expired When the fairness time expires, than access is awarded to a call based on an algorithm that awards access based on a round robin system or a performance history of each routing system.

In actual practice, the FA routine is integrated with other CTI applications and routines that may be in place at communication center 17 and in network 11 by virtue of T-server software. By using the FA routine, communication center 17 can provide more equal and fair agent access to separate routing systems such as systems 13 and 15, regardless of their latency characteristics. A detailed description of a T-server routine enhanced with the FA routine of the present invention is provided below.

Figure 2:
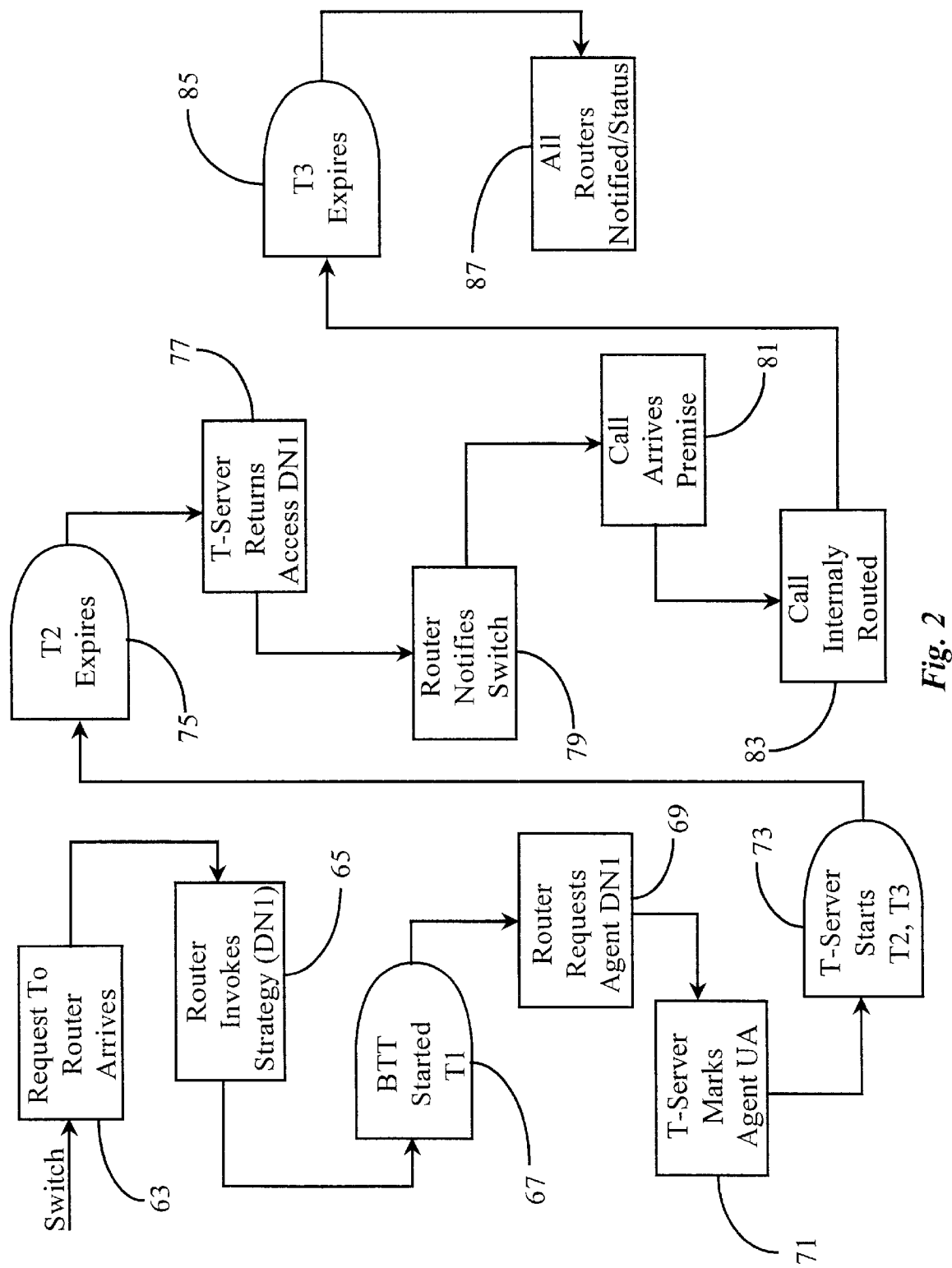
FIG. 2 is a process flow chart illustrating steps for reserving and connecting to an agent using a single router according to an embodiment of the present invention.

FIG. 2 is a process flow chart illustrating steps for reserving and connecting to an agent using a single router according to an embodiment of the present invention. The exemplary process represented herein illustrates a T-server routine integrated with a FA routine being executed for one call request made by one routing system such as system 13 of FIG. 1. This example may be used in conjunction with elements described in FIG. 1 to gain an understanding of the unique FA software. Therefore, many references will be made to elements of FIG. 1 throughout following example.

At step 63, a request to route arrives at an SCP such as SCP 23 (router) from a local network switch such as switch 27. The request is initiated by call 33, which is waiting to be connected to an agent at center 17. At step 65, SCP 23 invokes a routing strategy based on information from or about caller 33 and T-server software running on CTI processor 19. The strategy invoked in step 65 includes the selection of a destination number (DN 1) for an agent at communication center 17.

At step 67, a busy treatment timer (BTT), or Ti, is started at SCP 23. The BTT (Ti) determines how long a call must be held at a routing point before parking it in queue. Ideally, the BTT time period should be less than the maximum required response time (RRT) minus network round-trip latency (SCP 23 to CTI processor 37) minus T-server and router processing latencies. For example, if RRT equals 500 ms and round-trip delay (RTD) equals 60 ms, and T-server/Router latency is 210 ms, then the BTT for call 33 should be set for 230 ms.

At step 69, SCP 23 requests an agent from T-server software running on CTI processor 19. Such an agent may be one operating at workstation 53 taking calls at telephone 54 on DN 1, which may be, in this example, the number for telephone 54. At steps 71 and 73 T-server software running on processor 37 marks the agent at workstation 53 unavailable and starts an FA timer (T2), and an agent reservation timer (T3). The FA timer sets a period of time during which other routing systems may request access to a same agent, before one router will be granted access to the agent. In this example, however, there are no competing requests. No access is granted to any requesting router until T2 expires in step 75.

When FA timer T2 expires in step 75, T-server software running on processor 37 returns access confirmation for DN 1 to SCP 23 at step 77. At step 79, SCP 23 notifies switch 27 to route call 33 to DN1. At step 81 call 33 arrives at switch 35. Having successfully acquired access to the agent at workstation 53, call 33 is internally routed in step 83 to telephone 54 over wiring 39.

At step 85, T3 (agent reservation timer) expires but the current agent status reported to network routers such as SCP 25 is that the agent is busy with call 33. At step 87, all network routers are updated of DN1 status, which is busy.

FA timer (T2) is necessary to provide fair distribution of available agents between all separate routing systems competing for connection. Without T2, the routing systems with the shortest latency periods would acquire preferential access to all agents, as they became available. If all routing systems have the same delay factor (highly unlikely), then the T2 timer may be set to zero.

It is found through empirical method that the value of T2 should be about two times the difference in latency between the most geographically distant, and the closest network routers which are configured in the loop. The latency factors for each network router should be measured at approximately 95% delivery-probability time. This will insure that 95% of all calls will be processed according to a fair distribution algorithm.

It will be apparent to one with skill in the art that the example presented above involves only one network router requesting an agent. Therefore, a fairness algorithm was not invoked in this example. If another router had requested an agent during time period T2, then a fairness algorithm would be called once T2 had expired. An example of more than one router competing for an agent is provided below.

The agent reservation time T3 is the time that agents are marked as unavailable when they are reserved for a call. This time period is long enough for a reserving voice call to be routed through network 11, arrive at switch 35, be presented to the agent, and notification of agent status to be sent to all other network routers. If this time period is set too short, then there is a chance that one agent will receive two calls. If T3 is set for too long a period, the agent may be idle well after he has terminated the last event. A suggested time limit is approximately 10 seconds.

If agents in a communication center such as center 17 are routinely handling very short calls of only a few seconds or so, T3 may be canceled and an event-release detection (ERD) routine (known to the inventor) may be incorporated in T-server software running on CTI processor 37 (FIG. 1). An ERD routine detects released events for each agent at each DN and sends notification to all network routers.

It will be apparent to one with skill in the art that the process steps above may vary somewhat according to enterprise rules without departing from the spirit and scope of the present invention. For example, there may well be additional steps as well as sub-routines involved in actual practice. The inventor intends that the process steps illustrated herein only to be one example of a basic routine using only one router. A more complex interaction is provided below.

Figure 3:
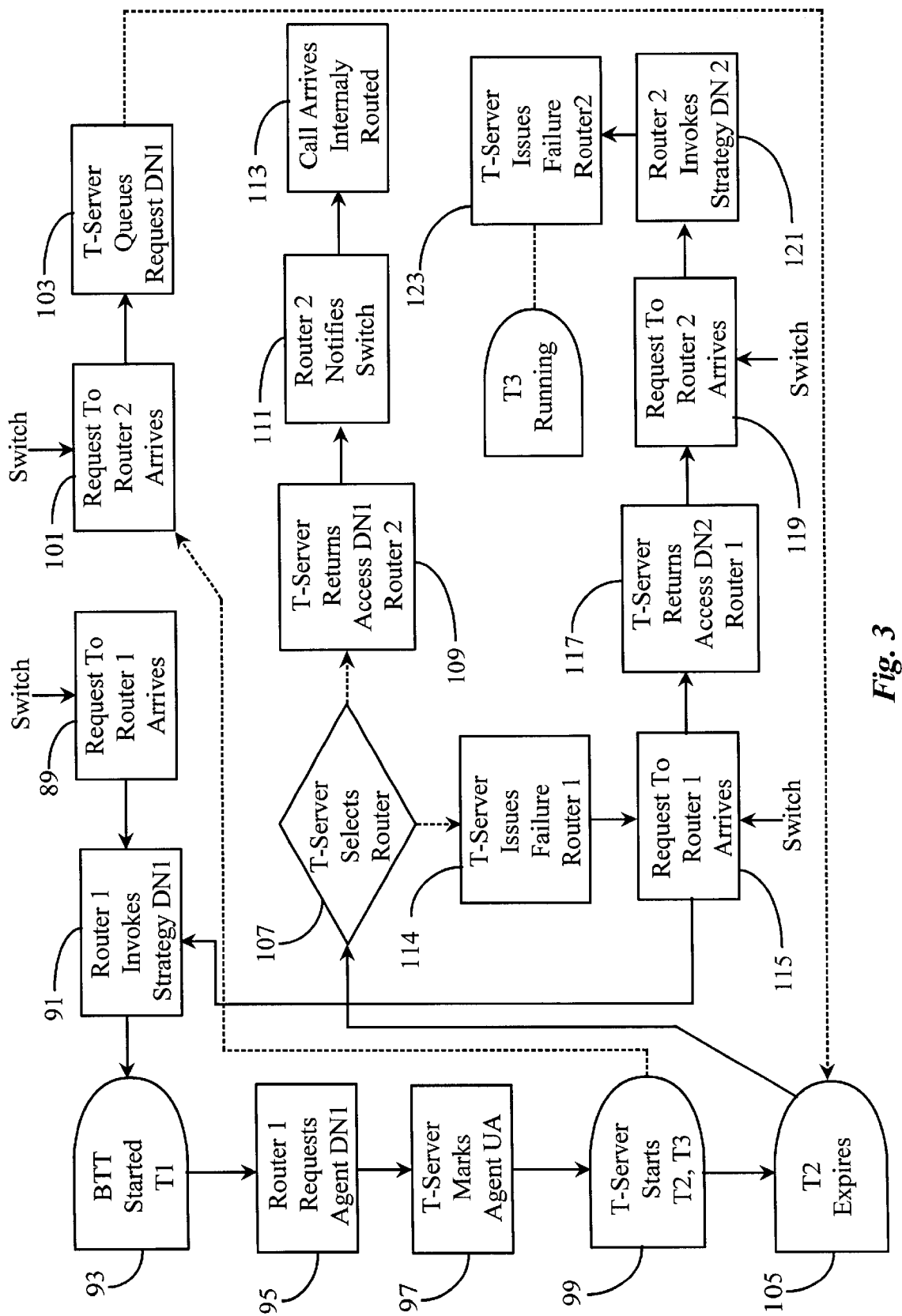
FIG. 3 is a process flow chart illustrating steps for determining which of two network-level routing systems will be granted access to an agent according to an embodiment of the present invention.

FIG. 3 is a process flow chart illustrating steps for determining which of two routing systems will be granted access to an agent according to an embodiment of the present invention. As with the example above referencing FIG. 2, the embodiment of FIG. 1 and elements contained therein will be referenced throughout this example.

At step 89, a route request arrives at SCP 23 from local switch 27 on behalf of call 33. SCP 23 invokes a routing strategy and selects DN1 in step 91. At step 93, a busy treatment timer T1 is started. At step 95, SCP 23 requests an agent on DN 1. At step 97, T-server marks the agent as unavailable. In step 99, T-server starts T2 (fairness timer) and T3 (reservation timer).

Note that the above-described process steps are the same as steps 63–73 described in FIG. 2, however, before T2 expires, a second routing system comes into play. Following the broken direction line from step 99, at step 101, a route request arrives at SCP 25 of routing system 15. The request arrives from local switch 29 on behalf of call 31. SCP 25 (competing router) repeats steps 91, 93, and 95 for a request of DN1. At step 103, T-server (processor 37 at center 17) queues the request for DN1 by SCP 25. It is noted here that the agent at DN1 has already been reserved by SCP 23, therefore, T2 and T3 have already been started (step 99). If additional routing systems (none shown) make requests for DN1 during the time period of T2, the requests will also be queued by T-server software running on processor 37.

Following the broken direction line from step 103, in step 105, T2 expires. Step 105 triggers step 107 as indicated by the solid direction line. In step 107, T-server software, by virtue of an FA routine employs an algorithm to determine which requesting routing system 13, or 15 (FIG. 1) will be granted access to DN1. The fairness algorithm may, in one embodiment, be based on an arbitrary rotation scheme between network routers such as SCP's 23 and 25. In another embodiment, statistical analysis may be used to keep individual percentages of granted requests to each routing system fairly even. This method would also take into account total requests from each routing system so as not to penalize one system for lack of requests. The fairness algorithm may be any one of many possible schemes. Employing the fairness timer (T2) insures that unintentional preferences or priorities are cancelled out for all routing systems.

At step 109, T-server employing the FA routine returns access for DN1 to router 2 (SCP 25) even though router 1 (SCP 23) was first to reserve an agent at DN1. At step 114, illustrated below step 107, T-server issues a failure notification regarding DN1 to SCP 23 in system 13. Steps 109 and 110 occur simultaneously and are indicated by broken direction lines emanating from step 107. Steps 111 and 113 represent the routing of call 31 from switch 29 to switch 35, and further internal routing to an agent at DN1, in this case one picking up telephone 54 at workstation 53.

Moving to step 115, another route request from local switch 27 to SCP 23 (router 1) arrives. Following the broken direction line from step 115, the process repeats steps 91–105, however in this case SCP 23 selects DN2 in the routing strategy (91). When T2 expires for DN2 (105), T-server returns access for DN2 to SCP 23. In this case no competing router made a request for DN2 during T2 time, therefore access was granted to SCP 23 (step 117).

At step 119, another route request arrives at SCP 25 from local switch 29. SCP 25 invokes a routing strategy in step 121 and selects DN2. However, the T3 timer (agent unavailable) invoked in step 99 for the agent at DN2 is still running. Therefore, T-server issues an immediate failure notification to SCP 25 in step 123. It will be noted here that while T2 and T3 timers are both running, competing requests for a same agent are queued as in step 103. At the end of T2 time, the fairness algorithm determines which router will get access. After T2, but during T3, the agent will be unavailable to all routers until T3 expires, unless an ERD routine is in place as described in FIG. 2.

It will be apparent to one with skill in the art that the process steps described above may vary according to communication center capability and enterprise rules without departing from the spirit and scope of the present invention. There may be added routines, and sub routines included and integrated with the various routing strategies of a communication center such as center 17.

It should also be apparent that there may be many routing systems of varying latency rates connected to one or a number of communication centers practicing the present invention. In this case there may be premise to premise routing. Such cases are handled in the same fashion as network to premise cases.

The present invention may be practiced in a communication center that is enhanced for IP telephony as well as COST telephony, and may be modified to work with alternate forms of media such as voice mail and the like. Therefore, the method and apparatus of the present invention should be afforded the broadest scope. The spirit and scope of the present invention is limited only by the claims that follow.

What is claimed is:

1. In a communication center, a method for ensuring fairness in response to electronic requests from network-level entities to connect to an agent station at the communication center, comprising steps of:

(a) receiving a first request from a first network-level entity for connection to the agent at the communication center;

(b) starting a fairness timer for a timed period;

(c) receiving, during the period of the fairness timer, a second request for the connection to the same agent station from a second network-level entity; and (d) determining to grant, through execution of a fairness algorithm at expiration of the period of the fairness timer, one of the first and second requests from the network level entities.

2. The method of claim 1 wherein latency times for network level entities requesting connection at the communication center are known, and in step (b) the period of the fairness timer is set to be equal to or greater than twice the difference between network round-trip latency for the longest latency and shortest latency routers requesting service from the communication center.

3. The method of claim 1 wherein in steps (a) and (c) the requests are for telephony connections, either connection-oriented switched telephony (COST) or Internet Protocol Network Telephony (IPNT) calls.

4. The method of claim 1 further comprising a step for starting an agent reservation timer at the same time as starting the fairness timer, the agent reservation timer having a period longer than that of the fairness timer.

5. The method of claim 4 wherein the period of the agent reservation timer is longer than that of the fairness timer by a time sufficient for a connection to be made to the agent station once access is granted, and for notification of the connection to be made to network-level entities.

6. The method of claim 1 wherein, in step (d) the fairness algorithm operates on one or both of load and agent availability data.

7. A communication center, comprising:

a communication switching device connected to agent stations for switching communications to individual ones of the agent stations;

a computer-telephony integration (CTI) processor coupled to the communication switching device; and a digital link between the CTI processor and network-level routing entities for receiving requests from network-level entities for connection to agent stations;

wherein the CTI processor, on receiving a first request for connection to an agent station, starts a fairness timer having a time-out period, and in the event of receiving a second or more requests for connection to the same agent station during the fairness time period, executes a fairness algorithm at the end of the time-out period to determine which request to grant.

8. The communication center of claim 7 wherein latency times for network-level entities requesting connection at the communication center are known, and the period of the fairness timer is set to be equal to or greater than twice the difference between network round-trip latency for the longest latency and shortest latency routers requesting service from the communication center.

9. The communication center of claim 7 wherein the connection requests are for telephony connections, either connection-oriented switched telephony (COST) or Internet Protocol Network Telephony (IPNT) calls.

10. The communication center of claim 7 wherein the CTI processor starts an agent reservation timer at the same time as starting the fairness timer, the agent reservation timer having a period longer than that of the fairness timer.

11. The communication center of claim 10 wherein the period of the agent reservation timer is longer than that of the fairness timer by a time sufficient for a connection to be made to the agent station once access is granted, and for notification of the connection to be made to network-level entities.

12. The communication center of claim 10 wherein the fairness algorithm operates on one or both of load and agent availability data.

13. An agent-reservation fairness software for operation in a communication center and dealing with requests by network-level routers for connection to agents at the communication center, comprising:

a monitor for monitoring incoming requests for connection to agents;

an initiator for starting a fairness timer having a fairness time-out period; and a fairness algorithm for determining which of multiple requests for connection to a same agent to grant;

wherein the monitor, on receiving a first request for connection to an agent causes the initiator to start the fairness timer, and at expiration of the fairness time-out period, in the event of further requests for connection to the same agent, the fairness algorithm executes and determines which request for the same agent to grant.

14. The agent-reservation fairness software of claim 13 wherein the period of the fairness timer is set to be equal to or greater than twice the difference between network round-trip latency for the longest latency and shortest latency routers requesting service from the communication center.

15. The agent-reservation fairness software of claim 13 wherein the requests are for telephony connections, either connection-oriented switched telephony (COST) or Internet Protocol Network Telephony (IPNT) calls.

16. The agent-reservation fairness software of claim 13 further comprising a second initiator for starting an agent reservation timer at the same time as starting the fairness timer, the agent reservation timer having a period longer than that of the fairness timer.

17. The agent-reservation fairness software of claim 16 wherein the period of the agent reservation timer is longer than that of the fairness timer by a time sufficient for a connection to be made to the agent station once access is granted, and for notification of the connection to be made to network-level entities.

18. The agent-reservation fairness software of claim 13 wherein the fairness algorithm operates on one or both of load and agent availability data.

* * * * *